US008617267B2

(12) United States Patent
Son (10) Patent No.: US 8,617,267 B2
(45) Date of Patent: Dec. 31, 2013

(54) REFORMER WITH HIGH DURABILITY

(75) Inventor: In-Hyuk Son, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 559 days.

(21) Appl. No.: 12/782,437

(22) Filed: May 18, 2010

(65) Prior Publication Data

US 2011/0158867 A1 Jun. 30, 2011

Related U.S. Application Data

(60) Provisional application No. 61/290,137, filed on Dec. 24, 2009.

(51) Int. Cl.
*B01J 7/00* (2006.01)
*C01B 3/36* (2006.01)
*C01B 6/24* (2006.01)
*C01B 3/02* (2006.01)

(52) U.S. Cl.
USPC ............ 48/61; 422/625; 423/644; 423/648.1; 48/197 R (58) Field of Classification Search
CPC ...... B01J 8/0214; B01J 8/0461; B01J 8/0465; C01B 2203/0811
USPC ....... 48/61, 127.9, 197 R; 422/627, 626, 198, 422/163, 625; 423/651, 644
See application file for complete search history.

(56) References Cited

U.S. PATENT DOCUMENTS

| 7,182,921 | B2 * | 2/2007 | Miura et al. ................... 422/187 |
| 7,547,334 | B2 * | 6/2009 | Brundage et al. ........... 48/197 R |
| 2003/0192251 | A1 | 10/2003 | Edlund et al. |

| 2004/0068933 | A1 | 4/2004 | Nakamura et al. |
| 2006/0112637 | A1 * | 6/2006 | An et al. ........................... 48/61 |
| 2007/0104625 | A1 | 5/2007 | Su |
| 2008/0274021 | A1 * | 11/2008 | Neels et al. ................... 422/198 |
| 2010/0104903 | A1 * | 4/2010 | Gummalla et al. ............. 429/20 |

FOREIGN PATENT DOCUMENTS

| CN | 1701038 A | 11/2005 |
| EP | 1 094 031 A1 | 4/2001 |
| JP | 63-201001 | 8/1988 |
| JP | 04-149003 | 5/1992 |

(Continued)

OTHER PUBLICATIONS

Extended European Search Report dated May 4, 2011 in corresponding European patent application No. 10251029.4, 6 shts.

(Continued)

*Primary Examiner* — Matthew Merkling
(74) *Attorney, Agent, or Firm* — Christie, Parker & Hale, LLP (57) ABSTRACT

A reformer having high durability and including a heating unit and a reforming unit. The heating unit has a hollow cylindrical shape or polygonal shape and a first combustor and a second combustor that receives and oxidizes heating unit fuel and anode off gas (AOG) at both ends thereof. The reforming unit includes a first reforming portion formed to surround the exterior of the heating unit, a second reforming portion formed to surround the exterior of the first reforming portion and a flow path portion connecting the first reforming portion and the second reforming portion to provide fluid communication therebetween. The flow path portion includes a pre-deformed portion extending along a direction substantially perpendicular to the central axis of the heating unit.

13 Claims, 5 Drawing Sheets

(56) References Cited

FOREIGN PATENT DOCUMENTS

| | | |
|---|---|---|
| JP | 07-187602 | 7/1995 |
| JP | 2001-199703 | 7/2001 |
| JP | 2001-220106 | 8/2001 |
| JP | 2003-160305 | 6/2003 |
| JP | 2004-288434 | 10/2004 |
| JP | 2009-067634 | 4/2009 |
| KR | 023729787 | 4/2012 |
| WO | WO 02/00548 A1 | 1/2002 |
| WO | WO 03/078311 | 9/2003 |

OTHER PUBLICATIONS

Japanese Office action dated Oct. 9, 2012, for corresponding Japanese Patent application 2010-190522, (3 pages).
The First Office Action (w/English translation) dated Feb. 1, 2013, issued for Chinese Patent Application No. 201010281604.X, 16 pages.

* cited by examiner

REFORMER WITH HIGH DURABILITY

CROSS-REFERENCE TO RELATED APPLICATION

This application claims priority to and the benefit of U.S. Provisional Application No. 61/290,137, filed on Dec. 24, 2009, in the United States Patent and Trademark Office, the disclosure of which is incorporated herein in its entirety by reference.

BACKGROUND

1. Field

An embodiment of the present invention relates to a reformer with high durability.

2. Description of Related Art

In recent years, due to concern about environmental pollution, various alternative and less polluting energy sources, such as fuel cells, with relatively high energy efficiency have been developed.

A fuel cell is a device (or a type of energy source) that directly converts chemical energy into electric energy through electrochemical reaction of hydrogen and oxygen. A fuel cell is classified as a polyelectrolyte fuel cell, a solid oxide fuel cell, or a molten carbonate fuel cell depending on the type of its electrolyte. Hydrogen used in the polyelectrolyte fuel cell is typically acquired from reformate that has been reformed from hydrocarbon fuel such as methanol, liquid petroleum gas (LPG), gasoline, etc. This reforming process is necessary because of the difficulties in storing and transporting pure hydrogen. The reformate may be a steam-type reformate resulting from a steam reform reaction of the hydrocarbon fuel. Here, in most fuel cell systems using the steam reform type reformate, a heating unit is required to supply heat for the steam reform reaction.

In the reforming process, after electrons are generated from a stack, reformate and other remaining materials are discharged from an anode of the stack, and this discharge is referred to as anode off gas (AOG). In the related art, the AOG is combusted by using an additional catalytic combustor and/or mixed with atmospheric gas to decrease the concentration of other discharge gases such as $H_2$, $CO$, and $CH_4$ in the AOG.

However, as worldwide environmental standards grow, there is a desire and need to more positively manage the AOG in the manufacturing of a fuel cell that may be used in an indoor environment. Also, considering that one of the main components of the AOG gas is hydrogen ($H_2$), and to satisfy environmental concerns of atmospheric pollution, there is an urgent desire or need to technologically develop a method for combusting the AOG gas that allows for both processing of the AOG and for improving the efficiency of the reformer.

To this end, an embodiment of the present invention provides a reformer that oxidizes or combusts the AOG by returning the AOG to a heating unit of the reformer to improve thermal efficiency and to satisfy certain environmental concerns. However, due to oxidation of the reformate, oxidation of the heating unit fuel, and/or oxidation of the AOG, the reformer has characteristic high-temperature atmosphere, that generates a plurality of hot spots. As such, there is a need to develop a design that can alleviate or distribute these hot spots. That is, in order to allow the reformer to operate for a long time without deterioration or damage, thermal shock caused by repetition of thermal expansion and shrinkage should be reduced or minimized through the alleviation or distribution of the hot spots to thereby reduce or minimize the deterioration and damage caused due to thermal stresses on the reformer.

However, because the heating unit operates at a high-temperature atmosphere, it may be difficult for a method to distribute and alleviate the hot spots to be satisfactory for the management of the lifespan of the reformer. As such, a more positive protection structure is needed and desired.

SUMMARY

An aspect of an embodiment of the present invention is directed to a reformer having a structure capable of protecting its reforming unit from being distorted by thermal expansion by having a flow path portion (or connector) between a first reforming portion and a second reforming portion, and the flow path portion has a pre-deformed portion extending along a direction substantially perpendicular to a heating unit.

An aspect of an embodiment of the present invention is directed to a reformer having a structure capable of protecting a reforming unit from being distorted by thermal expansion.

An aspect of an embodiment of the present invention is directed toward a reformer structure that protects from breakage and damage caused due to thermal transformation or distortion by pre-forming a curved portion in a part of the reformer where anode discharge gas in a reformer is introduced and thermal transformation is generated.

Embodiments of the present invention provide mechanisms for reducing or preventing an increase in the pressure of a combustor due to deterioration by appropriately distributing points where hot spots are generated. These appropriately distributed points are points of introduction and/or oxidation of the anode discharge gas into a heating unit of a reformer.

Embodiments of the present invention provide mechanisms for increasing the efficiency of a reformer by increasing combustion efficiency of discharge gas.

In particular, an embodiment of the present invention provides a thermally durable reformer. The reformer includes a heating unit, a first combustor configured to receive and oxidize a heating unit fuel at a first end of the heating unit, and a second combustor configured to receive and oxidize an anode off gas at a second end of the heating unit; a reforming unit, the reforming unit includes a first reforming portion surrounding the heating unit, a second reforming portion surrounding the first reforming portion, and a flow path portion connecting the first reforming portion and the second reforming portion to provide fluid communication therebetween. Here, the flow path portion includes a pre-deformed portion extending along a direction substantially perpendicular to the central axis of the heating unit, and the pre-deformed portion protects the reforming unit (specifically the flow path portion) from being distorted by thermal expansion caused by the heating unit (e.g. by the heat generated at the second combustor).

In one embodiment, the pre-deformed portion of the flow path portion includes a curved portion.

In one embodiment, the pre-deformed portion of the flow path portion includes a curved portion having a top-curved plate of the flow path portion and a bottom-curved plate of the flow path portion.

In one embodiment, the pre-deformed portion includes a curved portion having a convex surface.

In one embodiment, a reformer of the present invention has a flow path portion having a pre-deformed portion extending along a direction substantially perpendicular to the central axis of the heating unit, wherein the pre-deformed portion includes a curved portion having contour lines defining concentric circles around the central axis of the heating unit.

In one embodiment, the second combustor of a reformer of the present invention includes a nozzle configured to expel the anode off gas into the heating unit and the flow path portion having a pre-deformed portion extending along a direction substantially perpendicular to the central axis of the heating unit overlaps at least a portion of the nozzle.

In one embodiment, the second combustor of a reformer of the present invention includes a nozzle configured to expel the anode off gas in a direction perpendicular to the central axis of the heating unit.

In one embodiment, the first reforming portion of a reformer of the present invention has a first space configured to perform a steam reform reaction.

In one embodiment, the second reforming portion of a reformer of the present invention has a second space configured to perform a water gas shift (WGS) reaction.

In one embodiment, a reformer of the present invention has a flow path portion having a pre-deformed portion extending along a direction substantially perpendicular to the central axis of the heating unit, wherein the flow path portion is outside of both the second reforming portion and the first reforming portion.

In one embodiment, the flow path portion having a pre-deformed portion extending along a direction substantially perpendicular to the central axis of the heating unit is located outside of at least one of the second reforming portion and the first reforming portion.

An embodiment of the present invention provides a reformer including: a heating unit that extends along a first axis; a first combustor configured to receive and oxidize a heating unit fuel at a first end of the heating unit; a second combustor configured to receive and oxidize an anode off gas (AOG) at a second end of the heating unit; and a reforming unit. The reforming unit includes a first reforming portion surrounding the heating unit, a second reforming portion surrounding the first reforming portion, and a flow path portion connecting the first reforming portion and the second reforming portion thereby providing fluid communication between the first and second reforming portions. Here, the flow path portion includes a pre-deformed portion extending along a second axis crossing the first axis of the heating unit.

In one embodiment, the pre-deformed portion of the flow path portion has a curved portion.

In one embodiment, the curved portion of the deformed portion of the flow path portion has a top-curved plate of the flow path portion and a bottom-curved plate.

In one embodiment, the curved portion of the deformed portion of the flow path portion has a convex surface.

In one embodiment, the curved portion has contour lines defining concentric circles around the first axis of the heating unit.

Here, the reformer according to an embodiment of the present invention can prevent or block the pressure of a combustor from being increased due to deterioration by appropriately distributing points where hot spots are generated at portions of the reformer where anode discharge gas is introduced into a heating unit of the reformer and oxidized.

Further, in an embodiment of the present invention, a set or predetermined curved surface is formed in the flow path portion by a difference in the rate of thermal expansion when the fuel cell operates. The curved surface is subsequently restored to the original state when the fuel cell is not operating, thereby minimizing or reducing thermal transformation (or distortion) at high-temperature atmosphere.

Consequently, and according to embodiments of the present invention, by improving the efficiency and reliability of a reformer, it is possible to operate the reformer in an environmental-friendly manner and improve the lifespan of the reformer.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION

Hereinafter, an embodiment of the present invention will be described with reference to the accompanying drawings. Terms representing directions such as 'up, down, left, and right' used in the embodiment of the present invention are based on states displayed in the drawings if particularly defined or referred.

Figure 1:
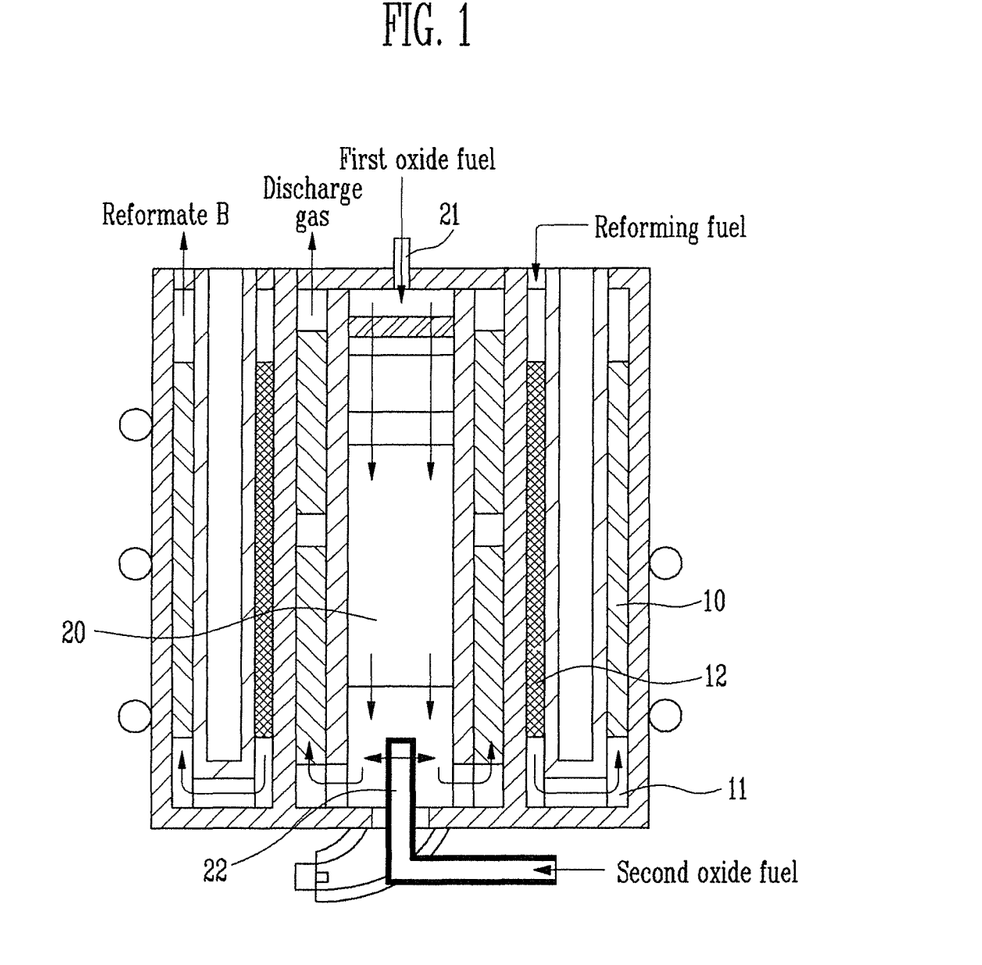
FIG. 1 is a longitudinal cross-sectional view schematically showing a configuration of a reformer pursuant to an embodiment of the present invention.

FIG. 1 schematically shows a reformer pursuant to an embodiment of the present invention. Referring to FIG. 1, the developing reformer includes a heating unit 20, a reforming unit composed of a first reforming portion 12, a second reforming portion 10, and a flow path portion (or connector) 11 providing fluid communication and connection between the first reforming portion 12 and the second forming portion 10; the reformer further including a first combustor 21, and a second combustor 22. Hereinafter, the above-described components will be described in more detail.

Figure 2:
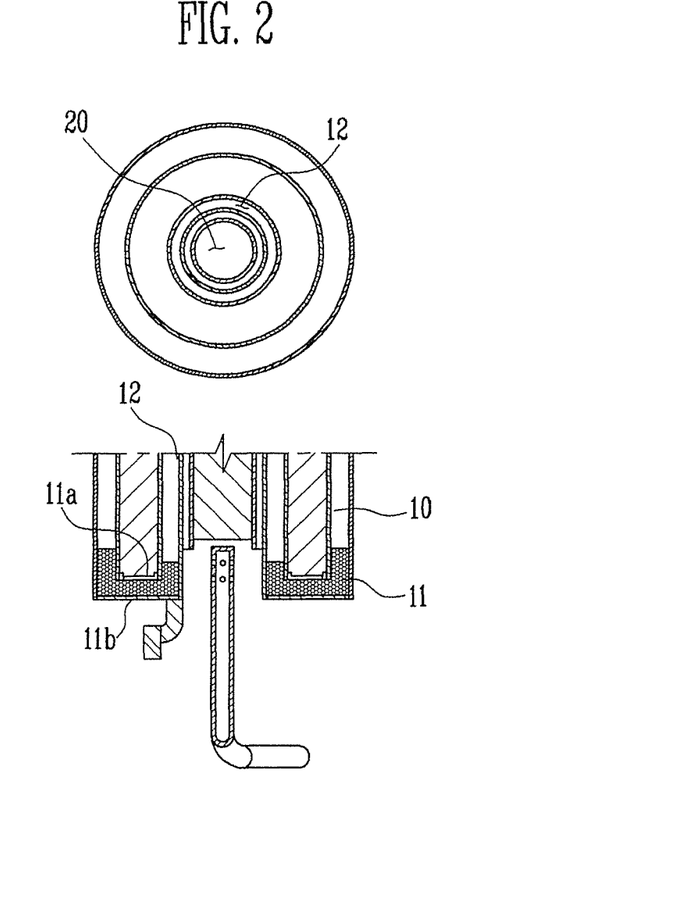
FIG. 2 is a transverse cross-sectional view schematically showing a configuration of a reformer pursuant to an embodiment of the present invention.

As shown in FIG. 1, the reformer has the heating unit 20 at the center thereof and extending along the central axis (the longitudinal central axis) of the reformer. The heating unit 20 has a hollow cylindrical shape or polygonal shape. As shown in FIG. 2, a first reforming portion 12 surrounding the heating unit 20 is provided on the outside of the heating unit 20 and a second reforming portion 10 surrounding the first reforming portion 12 is provided on the outside of the first reforming portion 12. Further, the first reforming portion 12 and the second reforming portion 10 are connected with each other by a flow path portion 11 on the bottom portions thereof to provide fluid communication between the first reforming portion and the second reforming portion. Here, the flow path portion 11 has a top plate 11a and a bottom plate 11b. The flow path portion 11 is welded onto the bottom portions of the first reforming portion 12 and the second reforming portion 10 to seal them.

A thermal structure according to an embodiment of the present invention, is provided, that has its highest temperature at the center (the central axis) of the reformer, and the temperature decreases in an outward direction from the central axis of the reformer, thereby maintaining a uniform oxidation temperature.

In addition, the first combustor 21 and the second combustor 22 that respectively receive and oxidize heating unit fuel and anode off gas (AOG), are provided at first and second ends of the heating unit 20. Here, the heating unit fuel includes primary fuel such as liquefied petroleum gas, (LPG), etc. supplied to maintain the temperature of the heating unit 20. The AOG is an uncombusted gas containing hydrogen discharged from an anode as a primary component after electricity is generated through an oxidation reaction in an electricity generator e.g., composed of one or more fuel cells, etc. In one embodiment, the first combustor 21 supplying and oxidizing the heating unit fuel is provided at or on the first end (e.g., the top or top end) of the heating unit 20 and the second combustor 22 resupplying and oxidizing the AOG is provided at or on the second end (e.g. the bottom, or bottom end of the heating unit 20.

Figure 6:
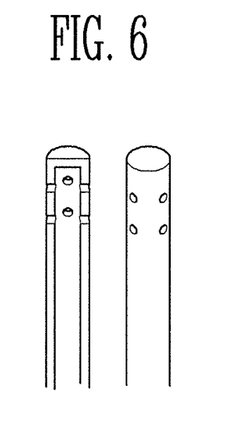
FIG. 6 is a perspective view and a longitudinal cross-sectional view showing a second combustor having four nozzles per one line, which are horizontally arranged in two lines according to an embodiment of the present invention.
Figure 7:
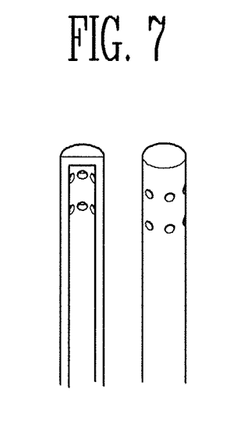
FIG. 7 is a perspective view and a longitudinal cross sectional view showing a second combustor having six nozzles per one line, which are horizontally arranged in a total of two lines according to an embodiment of the present invention.

The second combustor 22 has a nozzle to expel the AOG in a direction perpendicular to the central axis of the heating unit 20 as shown in FIGS. 6 and 7. That is, with respect to the nozzle of the second combustor 22, a plurality of nozzles is formed in a transverse direction to increase or maximize a mixing effect of the AOG and reduce any hot spots concentrated at or in the vicinity of the first oxide catalyst layer as shown in FIG. 6.

A basic reaction of the reformer is as follows. When the heating unit fuel such as LPG, etc. is supplied to the heating unit 20 to maintain a temperature required for reforming, the fuel cell is reformed (i.e., steam reformed, SR) in the first reforming portion 12 from heat transmitted from the heating unit 20. That is, the first reforming portion 12 has a first space configured to perform a steam reform reaction. Reformate generated at that time is supplied to the generator with carbon monoxide reduced through a water and gas shift (WGS) reaction in the catalyst layer of the flow path portion 11 and the second reforming portion 10. Herein, the second reforming portion 10 has a second space configured to perform the WGS reaction. Reformate (~71% H2, 25% CO2, ~1% CH4) of 7 LPM generated in the reformer produces electricity through the generator such as the stack, and thereafter, the generation amount of remaining reformate (~47% H2, ~45% CO2, ~1% CH4, N2 balance) is approximately 4.3 LPM. That is, pursuant to an embodiment of the present invention, hydrogen of approximately 3 SLPM (standard liters per minute) of hydrogen having a generation amount of approximately 5 SLPM is used to generate electricity and hydrogen of 2 SLPM remains as remaining gas, that is, the AOG. The AOG generated as described above is supplied into the heating unit 20 through the second combustor 22 and thereafter, is primarily oxidized and converted into heat.

Figure 3:
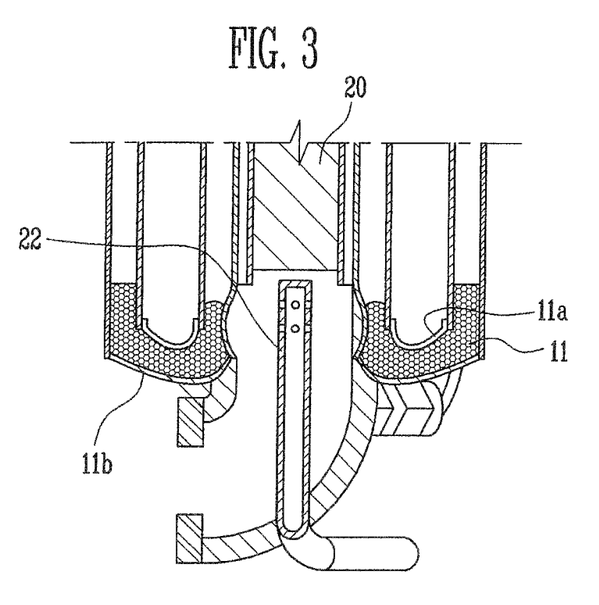
FIG. 3 is a longitudinal cross-sectional view showing a crack generated in a reformer having a dual oxidization structure.

A test operation evaluating the hot spots and influence on peripheral devices by the AOG was performed. As a result, as shown in FIG. 3, the bottom of the inner peripheral surface of the first reforming portion 12 is transformed (distorted) by thermal expansion at high-temperature atmosphere, and consequently, the top plate 11a and the bottom plate 11b of the flow path portion 11 constrains the transformation by the thermal expansion. Thereafter, the top plate 11a and the bottom plate 11b are simultaneously transformed (distorted) by high temperature, and/or welds (or weld points) to the first reforming portion 11 are thus, damaged during the transformation. The transformation strength is influenced by the thermal strength (the amount and concentration of hydrogen in the AOG), the thermal shock condition by a reformer operation (on-off) logic, as well as the characteristics of a material such as SUS steel configuring the reformer.

Figure 4A:
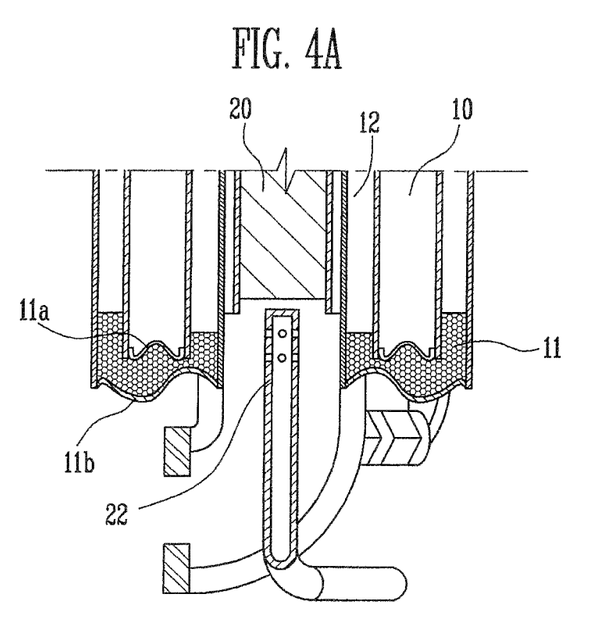
FIG. 4A is a longitudinal cross-sectional view showing a configuration of a flow path portion according to an embodiment of the present invention.
Figure 5:
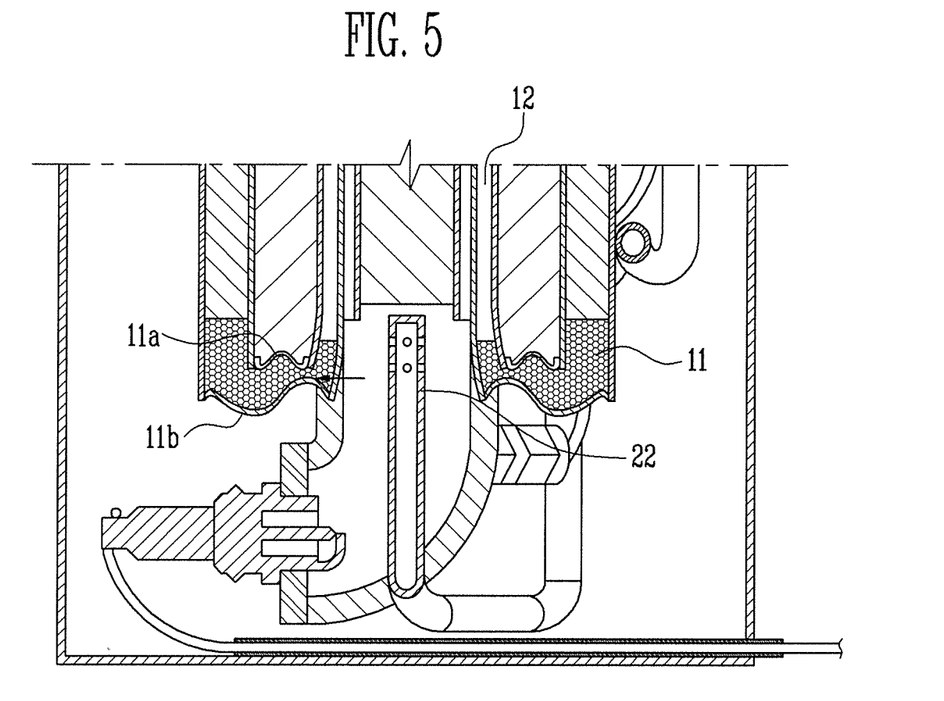
FIG. 5 is a longitudinal cross-sectional view showing a characteristic of a flow path portion during operation according to an embodiment of the present invention.

In one embodiment of the present invention, the problem as described above is solved through structural reinforcement of the thermal transformation (distortion). That is, as shown in FIG. 4A, a set or predetermined curved surface is pre-formed on the top plate 11a and the bottom plate 11b constituting the flow path portion 11. Thermal expansion stress that is transmitted in a direction perpendicular to the central axis when the reformer is actuated, is partially absorbed in the elasticity of the materials of the top plate 11a and the bottom plates 11b and the formed curved surface as shown in FIG. 5. Thereafter, when the reformer is not actuated, the reformer as shown in FIG. 4A, is restored to the original shape by the elastic force of the top plate 11a and the bottom plate 11b as well as the thermal shrinkage of the bottom of the first reforming portion 12.

Figure 4B:
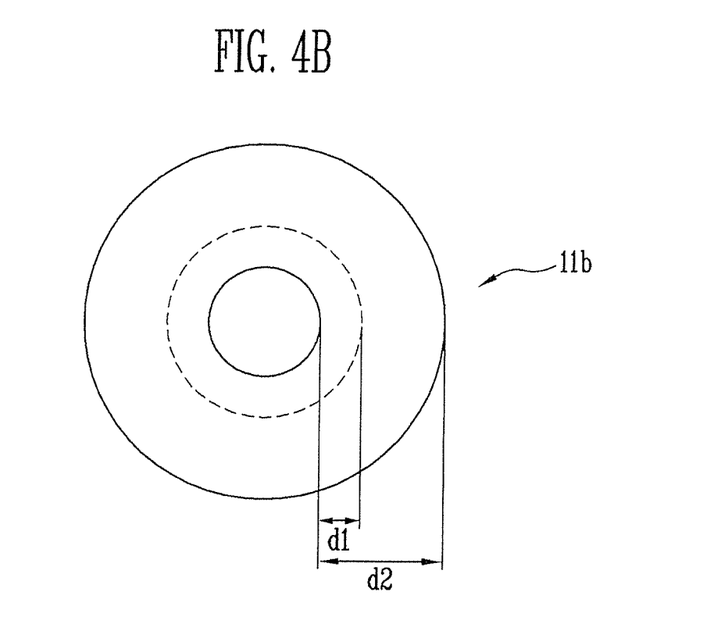
FIG. 4B is a plan view showing a bottom-curved plate of the flow path portion.
Figure 4C:
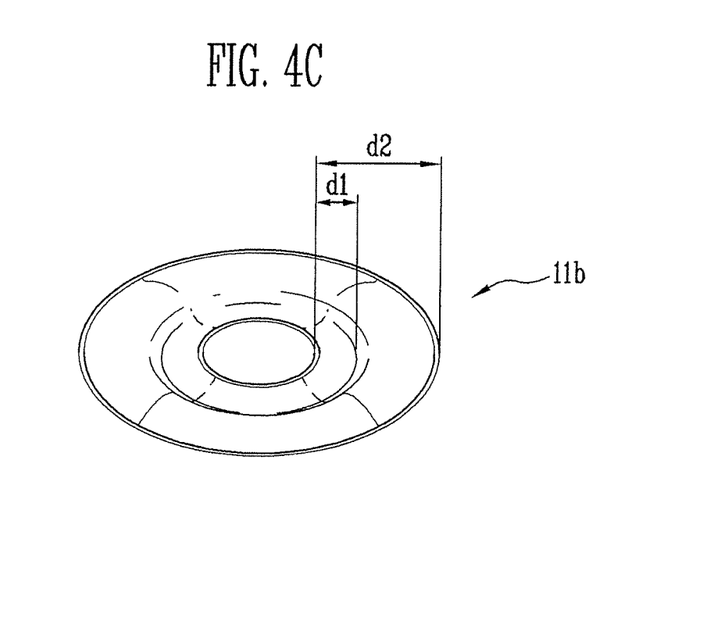
FIG. 4C is a bottom schematic view showing a curved portion of a bottom-curved plate in detail.

A contour line of the curve portion formed on the top plate 11a and the bottom plate 11b is formed from concentric circles based on the central axis of the heating unit (see FIGS. 4B, 4C), such that the bottom of the first reforming portion 12, and the top plate 11a and the bottom plate 11b are evenly stressed in a direction along the diameter of the concentric circles, thereby reducing or minimizing a probability of the damage. Specifically, FIGS. 4B and 4C exemplary illustrate three concentric circles with an innermost circle, an outermost circle and a middle circle between the innermost circle and the outermost circle. Here, the innermost circle is shown to be separated from the middle circle by a distance d1, and is separated from the outermost circle by a distance d2. In one embodiment, the distance d2 greater than or equal to twice the value of the distance d1.

In view of the foregoing and according to an embodiment of the present invention, a durable reformer for a fuel cell is provided with a structure capable of protecting a reforming unit from being distorted by thermal expansion. The reformer includes a heating unit, a first combustor configured to receive and oxidize a heating unit fuel at a first end of the heating unit, and a second combustor configured to receive and oxidize an anode off gas at a second end of the heating unit, a reforming unit having a first reforming portion surrounding the heating unit, a second reforming portion surrounding the first reforming portion, and a flow path portion outside the second forming portion and connecting the first reforming portion and the second reforming portion to provide fluid communication therebetween. Here, the flow path portion has a pre-deformed portion extending along a direction substantially perpendicular to the central axis of the heating unit and is pre-deformed with a shape that counters a distortion of the reforming unit (specifically the flow path portion) due to thermal expansion caused by the heating unit (e.g., by the heat generated at the second combustor).

While the present invention has been described in connection with certain exemplary embodiments, it is to be understood that the invention is not limited to the disclosed embodiments, but, the present invention may be implemented by various reformers with high durability within the scope without departing from the spirit of the appended claims and equivalents thereof.

What is claimed is:

1. A reformer comprising:
   a heating unit;
   a first combustor configured to receive and oxidize a heating unit fuel at a first end of the heating unit;
   a second combustor configured to receive and oxidize an anode off gas (AOG) at a second end of the heating unit; and
   a reforming unit comprising a first reforming portion surrounding the heating unit, a second reforming portion surrounding the first reforming portion, and a flow path portion connecting the first reforming portion and the second reforming portion to provide fluid communication therebetween,
   wherein the flow path portion comprises a pre-deformed portion comprising a curved portion comprising a top-curved plate of the flow path portion and a bottom-curved plate of the flow path portion, the pre-deformed portion extending along a direction substantially perpendicular to the central axis of the heating unit and being configured to increase the structural integrity of the reforming unit at the flow path portion.

2. The reformer of claim 1, wherein the curved portion has a convex surface.

3. The reformer of claim 1, wherein the curved portion has contour lines defining concentric circles around the central axis of the heating unit.

4. The reformer of claim 1, wherein the second combustor comprises a nozzle configured to expel the anode off gas into the heating unit, and wherein the flow path portion overlaps at least a portion of the nozzle.

5. The reformer of claim 1, wherein the second combustor comprises a nozzle configured to expel the anode off gas in a direction perpendicular to the central axis of the heating unit.

6. The reformer of claim 1, wherein the first reforming portion has a first space configured to perform a steam reform reaction.

7. The reformer of claim 1, wherein the second reforming portion has a second space configured to perform a water gas shift (WGS) reaction.

8. The reformer of claim 1, wherein the flow path portion is outside of both the second reforming portion and the first reforming portion.

9. The reformer of claim 1, wherein the flow path portion is outside of at least one the second reforming portion or the first reforming portion.

10. A reformer comprising:
    a heating unit extending along a first axis;
    a first combustor configured to receive and oxidize a heating unit fuel at a first end of the heating unit;
    a second combustor configured to receive and oxidize an anode off gas (AOG) at a second end of the heating unit; and
    a reforming unit comprising a first reforming portion surrounding the heating unit, a second reforming portion surrounding the first reforming portion, and a flow path portion connecting the first reforming portion and the second reforming portion to provide fluid communication therebetween, wherein the flow path portion comprises a pre-deformed portion comprising a curved portion having a convex surface, the pre-deformed portion extending along a second axis crossing the first axis of the heating unit, the pre-deformed portion being configured to increase the structural integrity of the reforming unit at the flow path portion.

11. The reformer of claim 10, wherein the curved portion comprises a top-curved plate of the flow path portion and a bottom-curved plate of the flow path portion.

12. The reformer of claim 10, wherein the curved portion has contour lines defining concentric circles around the first axis of the heating unit.

13. A reformer comprising:
    a heating unit;
    a first combustor configured to receive and oxidize a heating unit fuel at a first end of the heating unit;
    a second combustor configured to receive and oxidize an anode off gas (AOG) at a second end of the heating unit; and
    a reforming unit comprising a first reforming portion surrounding the heating unit, a second reforming portion surrounding the first reforming portion, and a flow path portion connecting the first reforming portion and the second reforming portion to provide fluid communication therebetween,
    wherein the flow path portion comprises a pre-deformed curved portion comprising a top-curved plate of the flow path portion and a bottom-curved plate of the flow path portion extending along a direction substantially perpendicular to the central axis of the heating unit,
    wherein the pre-deformed curved portion has contour lines defining three concentric circles around the central axis of the heating unit comprising an innermost circle, an outermost circle, and a middle circle between the innermost circle and the outermost circle,
    wherein the innermost circle is separated from the middle circle by a distance d1, and is separated from the outermost circle by a distance d2,
    wherein d2 is greater than or equal to twice the value of the distance d1.

* * * * *

UNITED STATES PATENT AND TRADEMARK OFFICE
CERTIFICATE OF CORRECTION

PATENT NO.            : 8,617,267 B2                                              Page 1 of 1
APPLICATION NO.       : 12/782437
DATED                 : December 31, 2013
INVENTOR(S)           : In-Hyuk Son It is certified that error appears in the above-identified patent and that said Letters Patent is hereby corrected as shown below:

On the Title Page

(56) References Cited, page 2,          After "WO 03/078311"
right column, line 2                    Insert -- A1 --

In the Claims

Column 7, Claim 9, line 53              After "one"
                                        Insert -- of --

Signed and Sealed this
Seventeenth Day of March, 2015

Michelle K. Lee
*Director of the United States Patent and Trademark Office*